I. L. SHEFFLER.
VACUUM CLEANER.
APPLICATION FILED JAN. 20, 1919.
Reissued Jan. 6, 1920.
14,786.
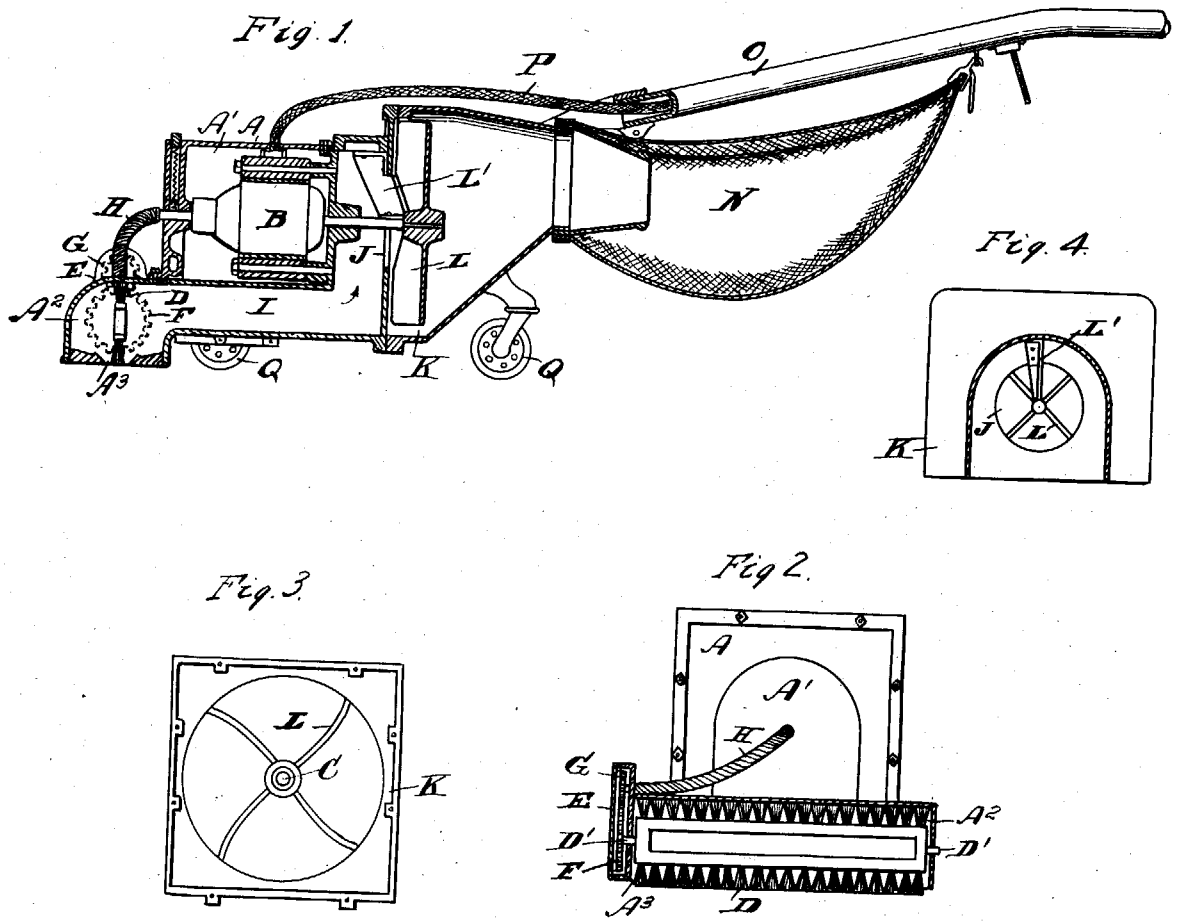
Witness
L. S. Woodhull
Inventor
Ira L. Sheffler
By C. B. Thomas
Attorney

UNITED STATES PATENT OFFICE.

IRA L. SHEFFLER, OF DETROIT, MICHIGAN, ASSIGNOR TO IRA LEE SUCTION CLEANER CORPORATION, A CORPORATION OF MICHIGAN.

VACUUM-CLEANER.

14,786. Specification of Reissued Letters Patent. Reissued Jan. 6, 1920.

Original No. 1,231,077, dated June 26, 1917, Serial No. 134,832, filed December 4, 1916. Application for reissue filed January 20, 1919. Serial No. 272,203.

*To all whom it may concern:*

Be it known that I, IRA L. SHEFFLER, citizen of the United States, residing at Detroit, county of Wayne, State of Michigan, have invented a certain new and useful Improvement in Vacuum-Cleaners, and declare the following to be a full, clear, and exact description of the same, such as will enable others skilled in the art to which it pertains to make and use the same, reference being had to the accompanying drawings, which form a part of this specification.

My invention relates to vacuum cleaners shown in the accompanying drawings and more particularly pointed out in the following specification and claims.

One of the objects of this invention is to increase the general efficiency of the apparatus through the peculiar construction of the casing housing the motor, and by the character of the power transmission employed between the motor, and the brush actuating mechanism.

One of the features of the invention consists in a flexible shaft connecting the motor shaft with a train of suitable gears for actuating the brush;—the flexible shaft being outside of the motor casing and removed from the path of the dust drawn through the apparatus, the thrust and consequent friction common to gear or belt driven devices being overcome by the use of said flexible shaft;—thus also decreasing the size and weight of the motor and usual diameter of the shaft.

Another feature of the invention consists in providing a dust channel leading from the suction intake in the brush chamber to the fan, the channel entering the fan chamber between the latter and the motor chamber; spaced therefrom to form a passage way at this point.

With the foregoing and other objects in view which will appear as the description proceeds, the invention resides in the construction hereinafter described and claimed, it being understood that changes may be made in the precise embodiment herein disclosed without departing from the spirit of my invention.

In the drawings accompanying this specification;—

Figure 1 is a longitudinal vertical sectional view through the device. Fig. 2 is a front elevation of the case showing the brush, and the driving gear chamber in section.

Fig. 3 is an elevation of the casing taken on the dividing line between the forward part of the casing and the fan chamber.

Fig. 4 is a transverse sectional view through the casing adjacent to the suction creating means.

Referring now to the letters of reference placed upon the drawings;—

A, denotes a chambered casing having a compartment $A^1$, in which is housed a horizontally arranged motor B.

Directly below the forward end of the armature shaft C, and extending laterally across the front of the casing is the brush chamber $A^2$, having a suction opening $A^3$. D, indicates a rotatable brush, the shaft $D^1$, of which is journaled in the end walls of the brush chamber, said shaft at one end extending into a gear case E, where it is fitted with a gear F. G, denotes a driving gear, in mesh with the gear F, connected directly with the end of an armature shaft C, by a flexible driving shaft H. I, indicates a dust channel leading from the brush chamber $A^2$, to the opening J, communicating with the fan chamber K. L, denotes an exhaust fan mounted on the other end of the armature shaft C. $L^1$, indicates a scraper depending from the wall of the casing, its lower portion being contiguous to both the motor shaft and fan blades, that it may intercept and prevent the winding of thread, string or other like elements around the shaft or fan blades. N, is the usual bag to receive dust or other matter delivered thereto.

O, denotes an operating handle and P, an electric service cord extending through the handle and connected with the motor B. Q, designates the wheels upon which the device is mounted.

Having indicated the several parts by reference letters the construction and operation of the device will be readily understood.

Electric current having been delivered to the motor from a source of supply, the rotatable brush is set in operation through the flexible transmission shaft connecting the end of the motor shaft with the gear driving the brush.

The dust upon being drawn through the suction opening in the brush chamber by the action of a fan is conveyed along the dust channel I, below the motor, entering the opening J, in front of a fan chamber (spaced from the motor to form a dust channel) passing thence through the exhaust opening at the rear into the dust receiving bag.

By locating the fan at the rear of the motor and spacing it therefrom that the dust may enter in front of the fan and be exhausted at the rear into the dust receiving bag, I am enabled to provide a form of construction especially adapted for operation under furniture or in places otherwise inaccessible. The weight and size of the motor and diameter of the shaft is materially reduced by the employment of a flexible shaft between the motor shaft and brush mechanism. So also by locating the flexible shaft entirely outside of the dust channels;—the danger of derangement of the parts through the passage of dust or other matter common to other forms of power transmission is avoided, while the wear occasioned through the thrust and side pull of devices employing other forms of power transmission for operating the brush are overcome.

Having thus described my invention what I claim is:—

1. In a vacuum cleaner, a wheeled casing provided with a nozzle, a brush located in the nozzle, a motor located in the casing and having its shaft extending through the front of the casing, a gear casing located at one end of the nozzle, a gear mechanism located in the gear casing, one of the gears of which has a short stub shaft extending through the wall of the gear casing, a flexible shaft connected at one end to the motor shaft and extending laterally over the nozzle and connected to said stub shaft of the gear mechanism, and a suction creating means located in the wheeled casing.

2. In a vacuum cleaner, a wheeled casing provided with a nozzle, a motor having a substantially horizontal shaft located in the casing, the shaft being in a plane at substantially right angles to the nozzle, a gear casing located at one end of the nozzle, a gear mechanism located in the gear casing and connected with the brush, a flexible shaft connected with one of the gears in said gear casing and also with the shaft of the motor, and a suction creating means located in the wheeled casing actuated by the motor.

3. In a vacuum cleaner, a wheeled casing provided with a nozzle, projecting from the front of the casing, a brush located in the nozzle, a motor located in the wheeled casing and having its shaft extending through the front of the casing above the plane of the nozzle, a gear mechanism located at one end of the nozzle and operatively connected to the brush, a flexible shaft connected with the end of the motor shaft and extending downwardly and at its end connected with said gear mechanism, whereby said flexible shaft is supported over the nozzle, and a suction creating means located in the wheeled casing.

4. In a suction cleaner, a casing, a nozzle connected with the forward part of the casing, a suction creating means located in the rear of said casing, a motor having a substantially horizontal shaft located between the suction creating means and the nozzle, said shaft extending rearwardly and connected to the suction creating means, a duct located below the upper plane of the motor and extending rearwardly from the nozzle beyond the end of the motor and connecting with the suction creating means, and dust receiving means into which the suction creating means exhausts.

5. In a vacuum cleaner, a wheeled casing provided with a nozzle projecting from the front of the casing and whose rear wall lies substantially in alinement with the front wall of the casing, a gear casing secured directly to one end wall of the nozzle, a gear mechanism in the gear casing, a duct leading from the nozzle through the wheeled casing, a motor located between the inner wall of said duct and the top of said wheeled casing, a flexible shaft connected with the forward end of said motor shaft and extending along the nozzle and connected to said gear mechanism, and a suction creating means located in the wheeled casing in the rear of the motor.

6. In a vacuum cleaner, a wheeled casing provided with a nozzle projecting from the front of the casing, a brush located in the casing, a gear casing secured directly to one end wall of the nozzle, a gear mechanism in the gear casing, a duct leading from the nozzle through the wheeled casing, a motor located between the inner wall of said duct and the top of said wheeled casing, in a forward relation to the suction creating means, a flexible shaft connected at one end to the gear mechanism and at the other end to one of the ends of the motor shaft, and a suction creating means located in the casing entirely in the rear of the motor.

7. In a vacuum cleaner, a casing, a motor having a substantially horizontal shaft housed in a chamber in the forward part of the casing, a nozzle located at the forward end of the casing in a plane at substantially right angles to the motor shaft, a duct leading from said nozzle extending substantially parallel with the shaft of the motor to the rear of the motor chamber, a suction creating means located in the rear part of the casing and connecting with said duct, a brush located in said nozzle and extending substantially the width thereof, gears for driving the brush, and a flexible shaft connected at one end to one of said gears and at the other end to one of the ends of the motor shaft.

In testimony whereof, I sign this specification in the presence of two witnesses.

IRA L. SHEFFLER.

Witnesses:

S. E. THOMAS,

JOHN CONSIDINE, Jr.